United States Patent [19]

Minagawa et al.

[11] 4,124,564

[45] Nov. 7, 1978

[54] SYNTHETIC RESIN STABILIZER COMPRISING A 2,2,6,6-TETRAMETHYLPIPERIDINE-4-ALCOHOL ESTER AND AN OLIGOMERIC CARBONATE

[75] Inventors: Motonobu Minagawa, Koshigaya; Naohiro Kubota; Toshihiro Shibata, both of Urawa, all of Japan

[73] Assignee: Argus Chemical Corporation, Brooklyn, N.Y.

[21] Appl. No.: 769,890

[22] Filed: Feb. 18, 1977

[30] Foreign Application Priority Data

Feb. 18, 1976 [JP] Japan ................................. 51-16793

[51] Int. Cl.$^2$ ............................................. C08K 5/34
[52] U.S. Cl. ............................. 260/45.8 N; 252/403; 260/45.7 R; 260/45.95 C
[58] Field of Search ...................... 260/45.8 N, 45.7 R, 260/45.95 C, 47 XA; 252/403

[56] References Cited

U.S. PATENT DOCUMENTS

| | | | |
|---|---|---|---|
| 2,999,841 | 9/1961 | Csendes | 260/45.95 E |
| 3,223,677 | 12/1965 | Matzner | 260/47 XA |
| 3,244,650 | 4/1966 | Hecker et al. | 260/45.95 E |
| 3,510,507 | 5/1970 | Bown et al. | 260/45.95 C |
| 3,840,494 | 10/1974 | Murayama et al. | 260/45.8 N |
| 3,899,464 | 8/1975 | Murayama et al. | 260/45.8 N |
| 4,021,432 | 5/1977 | Holt et al. | 260/45.8 N |

FOREIGN PATENT DOCUMENTS 2,505,071 6/1975 Fed. Rep. of Germany.
1,080,335 1/1966 United Kingdom.

OTHER PUBLICATIONS

Polymer Engineering and Science—Jul. 1966, pp. 231–239.
Chemical Abstracts 84 (1976) 5945f.

*Primary Examiner*—V. P. Hoke
*Attorney, Agent, or Firm*—Otto S. Kauder

[57] ABSTRACT

Stabilizer compositions are provided whose ingredients interact synergistically to improve the resistance to deterioration on light exposure and heating of synthetic resin compositions. The interacting ingredients are (a) a carboxylic acid ester of a 2,2,6,6-tetramethylpiperidine-4-alcohol having 15 to 75 carbon atoms and 1 to 4 ester groups, and (b) at least one carbonate ester of an ortho-substituted polyhydric phenol having in the molecule one to three benzenoid rings, two to three phenolic hydroxyl groups, and in each benzenoid ring one to two alkyl, cycloalkyl, or aralkyl groups of which at least one is positioned ortho to a phenolic hydroxyl group.

Synthetic resin compositions are provided that are stabilized with the stabilizer compositions disclosed, including olefin polymers, polyamides, acrylic polymers, and vinyl halide polymers.

24 Claims, No Drawings

SYNTHETIC RESIN STABILIZER COMPRISING A 2,2,6,6-TETRAMETHYLPIPERIDINE-4-ALCOHOL ESTER AND AN OLIGOMERIC CARBONATE

BACKGROUND OF THE INVENTION

This invention relates to new stabilizer combinations, and to synthetic resin compositions, particularly olefin polymer, acrylic polymer, vinyl halide polymer, and polyamide compositions containing the same, and having as a result an increased resistance to deterioration in color and mechanical properties when exposed to light or heated at elevated temperatures of the order of 150° C. and higher.

The pioneer disclosure of 2,2,6,6-tetramethylpiperidine-4-alcohol esters for stabilizing a polymer is believed to be by K. Murayama in U.S. Pat. No. 3,640,928 of Feb. 8, 1972. Murayama stabilized synthetic polymers including polyolefins, polyvinyl chloride, polyvinylidene chloride, polyurethane, and polyamide against photo- and thermo-deterioration by incorporating 0.01 to 5% by weight of the synthetic polymer of a piperidine derivative having the general formula:

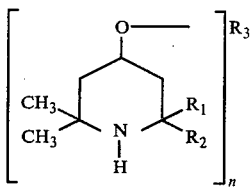

in which $R_1$ and $R_2$, which may be the same or different, each are an alkyl group such as methyl, ethyl, isopropyl or dodecyl, or they form, together with the carbon atom to which they are attached, a saturated alicyclic group such as

or a group of the formula

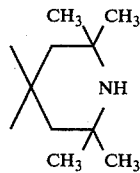

$n$ is an integer of 1 to 3 inclusive, and $R_3$ is an acyl group.

Murayama characterized his piperidine derivative stabilizers as showing a high degree of stabilizing action on synthetic polymers against photo deterioration with no appreciable degree of coloring action on the polymers; they can be used together with plasticizers and other known stabilizers without coloring the polymers to be stabilized or reduction in their stabilizing ability; they show little thermal sublimation and exudation; and they exhibit excellent stabilizing action against thermo-deterioration as well as photo-deterioration Murayama further stated that if desired, two or more of the piperidine derivative may be used in admixture, and the piperidine derivatives may be used alone or in combination with other known stabilizers, fillers, pigments, and the like (see column 6, lines 14–16). While Murayama disclosed a very large number of piperidine derivative stabilizers and polymer compositions stabilized therewith, the only polymer composition disclosed by Murayama that contains stabilizers added to the piperidine derivative is a polyvinyl chloride stabilized with a combination of lead stearate, dibasic lead stearate and cadmium stearate.

The Murayama et al. patent has been followed by a large number of patent and literature disclosures by Murayama et al. and others of polymer stabilizer compounds including a 2,2,6,6-tetrasubstituted-4-piperidyl group in the molecular structure, of which the following selection is representative. Thus Murayama in U.S. Pat. Nos. 3,898,303 of Aug. 5, 1975 and 3,941,744 of Mar. 2, 1976 disclosed 2,2,6-6-tetramethylpiperidino-spiro-hydantoin derivatives. Murayama in U.S. Pat. No. 3,899,464 of Aug. 12, 1975 disclosed 2,2,6,6-tetramethylpiperidinospiro-1,3-dioxane compounds. Murayama in U.S. Pat. No. 3,933,735 of Jan. 20, 1976 disclosed 2,2,6,6-tetrasubstituted-4-piperidone derivatives.

Murayama in U.S. Pat. No. 3,940,363 of Feb. 24, 1976 disclosed a further variation in which two 2,2,6,6-tetrasubstituted-4-piperidyl groups are linked together via the ring nitrogen atom to a bivalent organic linking group.

Randell in published patent application Ser. No. B408,123 of Apr. 3, 1976 disclosed 2,2,6,6,-tetrasubstituted piperidine-4-ols with a 1 to 20 carbon atom organic substituent on the piperidine nitrogen.

C. Ramey in U.S. Pat. Nos. 3,920,661 of Nov. 18, 1975 and 3,939,163 of Feb. 17, 1976 disclosed 3 to 10 carbon atoms dicarboxylic acids and salts in which one carboxylic acid group is esterified with a 2,2,6,6-tetrasubstituted-4-hydroxy piperidine.

B. Cook in U.S. Pat. Nos. 3,929,804 of Dec. 30, 1975, and 3,939,168 of Feb. 17; 3,971,795 of July 27 and 3,998,784 of Dec. 21, 1976 disclosed 2,2,6,6-tetrasubstituted-4-piperidinoacetic acid esters, thiolesters, and amides and similar 4-piperidinoacetic acid compounds additionally substituted on the nitrogen atom of the piperidine ring with an organic group having 1 to 12 carbon atoms.

Throughout these disclosures, the emphasis is on the synthesis of new 2,2,6,6-tetrasubstituted piperidine compounds and the demonstration of their utility in stabilized synthetic resin compositions. Disclosure of additional stabilizing ingredients to be used in such resin compositions is either entirely absent or completely unspecific, embracing any and all known compounding ingredients without distinction. Typical of the latter kind of unspecific disclosure is that in Murayama U.S. Pat. No. 3,640,928 already cited, or the following statement by Cook (see column 7 lines 4 to 13 of U.S. Pat. No. 3,998,784):

> Optionally, the composition of the invention may contain one or more further additives, especially those used in polymer formulations, such as antioxidants of the phenol or amine type, U.V. absorbers and light protectants, phosphite stabilisers, peroxide decomposers, polyamide stabilisers, basic co-stabilisers, polyvinyl chloride stabilisers, nucleation agents, plasticizers, lubricants, emulsifiers, anti-static agents, flame-protectants, pigments, carbon black, asbestos, glass-fibres, kaolin and talc.

The present invention therefore includes binary, tertiary and multi-component compositions containing, as stabiliser, a compound of formula I together with one or more functional additives for polymers.

Following this statement, Cook recites 13 classes of phenolic antioxidants and one class of amine antioxidants, encompassing over 100 specifically named compounds; 8 classes of ultraviolet absorbers and light protectants encompassing over 50 specifically named compounds; phosphite stabilizers including two subclasses and 6 specifically named compounds; peroxide-decomposing compounds including two subclasses and 6 specifically named compounds; classes of polyamide stabilizers, polyvinyl chloride stabilizers, and basic co-stabilizers with 6 subclasses and 6 specifically named compounds.

In the only Examples where Cook discloses specifically the use of a 2,2,6,6-tetrasubstituted piperidine compound with another stabilizer, there are blended 38 parts of polypropylene with 0.076 parts of n-octadecyl-3-(4'-hydroxy-3',5'-t-butylphenyl)propionate and 0.19 part of one of five 2,2,6,6-tetrasubstituted piperidines. Light stability was measured by determining the exposure time for 50% loss of the initial tensile elongation. Heat stability was not measured. Nothing is said of any contribution to light stability by the added propionate.

As a convenient summary of much of the prior art of stabilizing polyolefins, polyvinyl chloride, and polyamides, the recitation from column 7 line 18 to column 13 line 29 of Cook U.S. Pat. No. 3,998,784 is here incorporated by reference.

Further perspective on the prior art of polymer stabilization can be had by consulting the disclosures of classes of stabilizers and individual members thereof by M. Minagawa in U.S. Pat. Nos. 3,733,288 of May 15, 1973 and 3,907,517 of Sept. 23, 1975 as well as the review by L. Nass in "Encyclopedia of Polymer Science and Technology" (N. Bikales, executive editor, J. Wiley-Interscience, New York) volume 12 (1970) pages 725–768.

D. Bown et al. in U.S. Pat. Nos. 3,510,507 of May 5, 1970 and 3,691,132 of Sept. 12, 1972 disclosed polyolefins stabilized with polyphosphites, polyphosphates, polyphosphonites, polyphosphonates, polyborates, polycarbonates, and polysilanes which are condensation products of a 4,4'-bisphenol with a condensing or linking agent which may be of the ester type, such as the esters of triaryl or mixed arylalkyl compounds, or the acid halide type. Bown's condensation product stabilizers have molecular weights between 600 to 8000 or higher and are described by the structural formula,

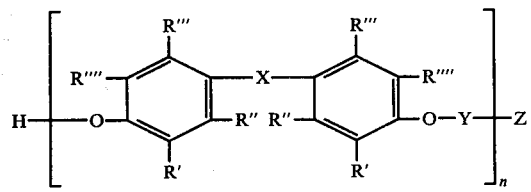

where X is selected from the group consisting of

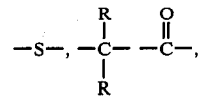

—C—C, and C—A—C—where A is a $C_1$ to $C_{16}$ alkylene or an arylene; R', R", R''', and R'''' are selected from the group consisting of hydrogen, $C_1$ to $C_{18}$ alkyls, and an aryl group; Y is selected from the group of

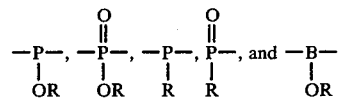

where R is hydrogen, a $C_1$ to $C_{18}$ alkyl, or aryl;

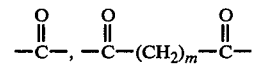

where $m$ is 0 to 10, preferably 4 to 8,

where A' is $(CH_2)_n$—S—$(CH_2)_n$ or —$(CH_2)_n$—S—$(CH_2)_m$—S—$(CH_2)_n$ where $n$ is 0 to 10, preferably 2 and $m$ is 0 to 10, preferably 5;

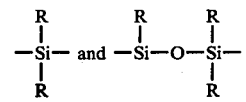

where R is an alkyl, preferably methyl, and Z is

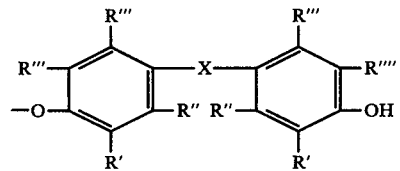

where R', R", R''', R'''', and X correspond respectively to the R', R", R''', R'''', and X previously selected when $n$ has a value from 1 to 15, or Z may be derived from the compound used to introduce Y into the product when $n$ has a value from 2 to 15, for example —R or —OR where R is hydrogen, an alkyl, or aryl. When Y in the formula of Bown's stabilizer is

the stabilizer is a type of hydroxyaryl phosphite. Similarly, when Y in the formula is

the stabilizer is a hydroxyaryl carbonate.

Bown's condensation products are described as especially effective in high molecular weight solid polyolefins when used together with a dialkyl sulfide costabilizer such as dilauryl thiodipropionate, distearyl thiodipropionate, ditridecyl thiodipropionate, dicetyl sulfide, bis(tetradecylmercapto) paraxylylene, and 10,24-dithiotetracontane.

J. Floyd et al in German published application 2505071 of Aug. 14, 1975 abstracted in Chemical Abstracts 1976, Volume 84, abstract no. 5945f, disclosed low molecular weight polycarbonate esters of bisphenols such as 2,2-bis(3-t-butyl-4-hydroxyphenylpropane) and 4,4'-butylidene bis(6-t-butyl-3-methylphenol) prepared in such a way as to contain few or no free phenolic hydroxyl groups as being highly effective heat and light stabilizers for polyolefins and giving a synergistic effect with distearyl thiodipropionate, tris (nonylphenyl) phosphite, and distearyl pentaerythritoldiphosphite.

SUMMARY OF THE INVENTION

In accordance with this invention, the resistance to deterioration upon heating of synthetic resin is increased synergistically by compounding the resin with a stabilizer composition comprising in combination (a) at least one carboxylic acid ester of an alcohol linked to the 4-position of a 2,2,6,6-tetramethylpiperidine compound and having 15 to 75 carbon atoms and 1 to 4 ester groups and (b) at least one carbonate ester of an ortho-substituted polyhydric phenol having in the molecule one to three benzenoid rings, two to three phenolic hydroxyl groups, and in each benzenoid ring preferably 1 to 2 alkyl, aryl, cycloalkyl, aralkyl or alkaryl groups of which at least one is positioned ortho to a phenolic hydroxyl group. Quite small amounts of the stabilizer composition are effective in increasing resistance to deterioration. The amount of each ingredient of the stabilizer composition required can be as little as 0.01% by weight of the resin and up to about 5% by weight; larger amounts can be used but tend to be unnecessary and wasteful. The amount of stabilizer composition to be used ranges from 0.02% to about 10% by weight of the resin, preferably from 0.1% to 2% by weight. The weight ratio of the 2,2,6,6-tetramethylpiperidine-4-alcohol carboxylic acid ester to the carbonate ester in the stabilizer composition of this invention can range from about 10 to 1 to about 1 to 5.

In addition to increasing the resistance to deterioration on heating, the stabilizer compositions of this invention impart to resin compositions in which they are used outstanding resistance to the deleterious effects of ultraviolet light, that is light of wave length shorter than 400 nanometers, and to the harmful effects of gases such as nitrogen oxides present in polluted atmospheric conditions.

DESCRIPTION OF PREFERRED EMBODIMENTS

The carboxylic acid ester of an alcohol linked to the 4-position of a 2,2,6,6-tetramethylpiperidine compound, which is ingredient (A) of the stabilizer composition of this invention, is derived from a 2,2,6,6-tetramethylpiperidine alcohol having 9 to 15 carbon atoms and a carboxylic acid having 1 to 4 carboxyl groups and 2 to about 28 carbon atoms. For convenience and brevity, this ingredient is referred to as "2,2,6,6-tetramethylpiperidine ester" in the remainder of this specification, and at each mention the term 2,2,6,6-tetramethylpiperidine ester is intended to refer to the carboxylic acid ester of an alcohol linked to the 4-position of 2,2,6,6-tetramethylpiperidine.

The 2,2,6,6-tetramethylpiperidine ester used in the stabilizer composition of this invention has a six-member saturated heterocyclic piperidine ring containing one nitrogen atom and five carbon atoms. The two carbon atoms linked directly to the nitrogen atom each carry two methyl group substituents. The nitrogen atom can carry either a hydrogen atom substituent or an oxygen radical (—O·) substituent. The carbon atom in the 4-position of the heterocyclic ring (i.e. the ring carbon atom furthest removed from the nitrogen) is linked to an alcoholic group esterified with a carboxyl group of a carboxylic acid. The link of the 4-position of the heterocyclic ring to the alcoholic group can be a single bond or a link through an oxygen heterocyclic ring having 2 ring oxygen atoms linked to the 4-position of the piperidine ring and an alkylene group of 2 to 3 carbon atoms linked to the two ring oxygen atoms and the alcoholic group of the carboxylic acid ester. The carbon atoms of the oxygen heterocyclic ring can carry hydrogen atoms and lower alkyl group substituents.

The 2,2,6,6-tetramethylpiperidine ester used in the stabilizer composition of this invention is an ester of a carboxylic acid that can be open chain, carbocyclic, or heterocyclic. Carboxylic acid esters that can be converted to 2,2,6,6-tetramethylpiperidine esters and used according to this invention include acetic acid, propionic acid, trimethylacetic acid, oxalic acid, succinic acid, tartaric acid, citric acid, glutaric acid, 2-ethylhexoic acid, neodecanoic acid, lauric acid, stearic acid, tetra cosanoic acid, benzoic acid, toluic acid, isophthalic acid, trimellitic acid, naphthenic acid, hexahydrophthalic acid, camphoric acid, pinic acid, dehydrobietic acid, ethylenediamine-tetraacetic acid, 3-butylthiopropionic acid, thiodipropionic acid, and thiophenedicarboxylic acid.

The 2,2,6,6-tetramethylpiperidine ester preferably contains piperidine nitrogen in the range of 2 to 8 per cent by weight.

A preferred group of 2,2,6,6-tetramethylpiperidine esters used in the stabilizer composition of this invention can be represented by the formula:

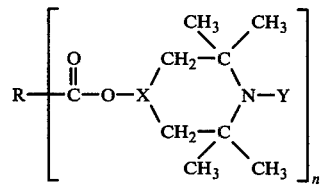

in which n is a whole number from 1 to 4, Y is selected from the group consisting of hydrogen and oxyl radical, X is a three valent linking member selected from the group consisting of —CH<,

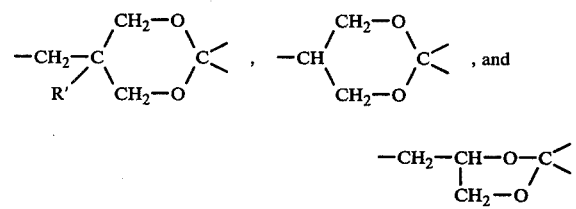

wherein R' is a lower alkyl group, and R is an organic group having a valence of n that can be open chain, carbocyclic, and heterocyclic. Lower alkyl R' groups include for example methyl, ethyl, propyl, isopropyl, n-butyl, and isobutyl. R groups can be for example alkyl such as ethyl, t-butyl, 2-heptyl, 1-undecyl, and 1-tricosanyl; aryl such as phenyl, t-butylphenyl, and 1-naphthyl; alkenyl such as allyl, methallyl, vinyl, propenyl, and 8-heptadecenyl; aralkyl such as benzyl and hydrocinnamyl; alkylene such as ethylene, 1,4-butylene, and decamethylene; alkenylene such as vinylene and 2-butene-1,4-diiyl; cycloalkylene and cycloalkenylene such as methylcyclopentylene, cyclohexenylene, and bicycloheptenylene; and heterocyclic groups such as furyl, thienyl, and pyrrolidonyl.

The 2,2,6,6-tetramethylpiperidine ester ingredient of the stabilizer composition of this invention is readily prepared from known and available starting materials. The key intermediate is 2,2,6,6-tetramethylpiperidine-4-one, which can be synthesized from ammonia and acetone in the presence of a mild acid catalyst such as ammonium chloride, calcium chloride, and magnesium chloride. The piperidinone is then converted to 2,2,6,6-tetramethylpiperidine-4-ol by catalytic hydrogenation with, for example, a platinum or a Raney nickel catalyst, or by a chemical reduction with a reagent such as sodium/alcohol combination, zinc/acetic acid combination, or sodium borohydride. Alternatively, the piperidinone can be converted to an oxygen heterocyclic alcohol linked to the 4-position of the piperidine ring by reaction with a trihydric alcohol having at least two hydroxyl groups in 1,2- or 1,3-orientation to each other. Suitable trihydric alcohols include glycerol, 1,2,4-butanetriol, 1,2,6-hexanetriol, trimethylolpropane, and trimethylolethane. This reaction can be illustrated by the acid catalyzed condensation of 1,2,6-hexanetriol with 2,2,6,6-tetramethylpiperidine-4-one as follows:

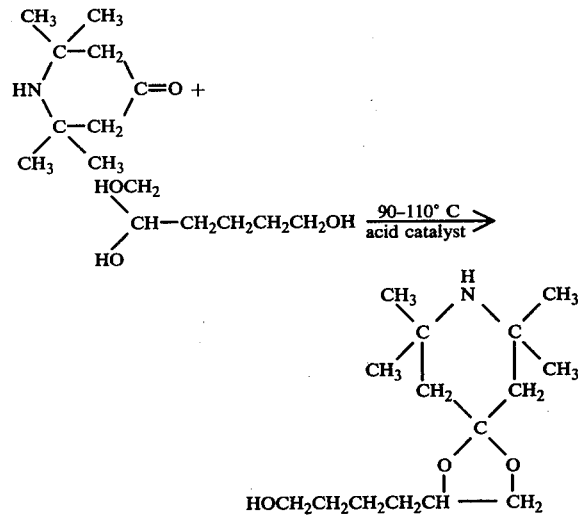

The next step in the preparation of the 2,2,6,6-tetramethylpiperidine ester used according to this invention is the conversion of the intermediate alcohol linked to the 4-position of a 2,2,6,6-tetramethylpiperidine to the carboxylic acid ester by direct esterification of the desired carboxylic acid, carboxylic acid anhydride, or carboxylic acid halide, or by transesterification of a phenyl ester or lower alkyl ester of the carboxylic acid. Illustrations of such a direct esterification and a transesterification are shown as follows:

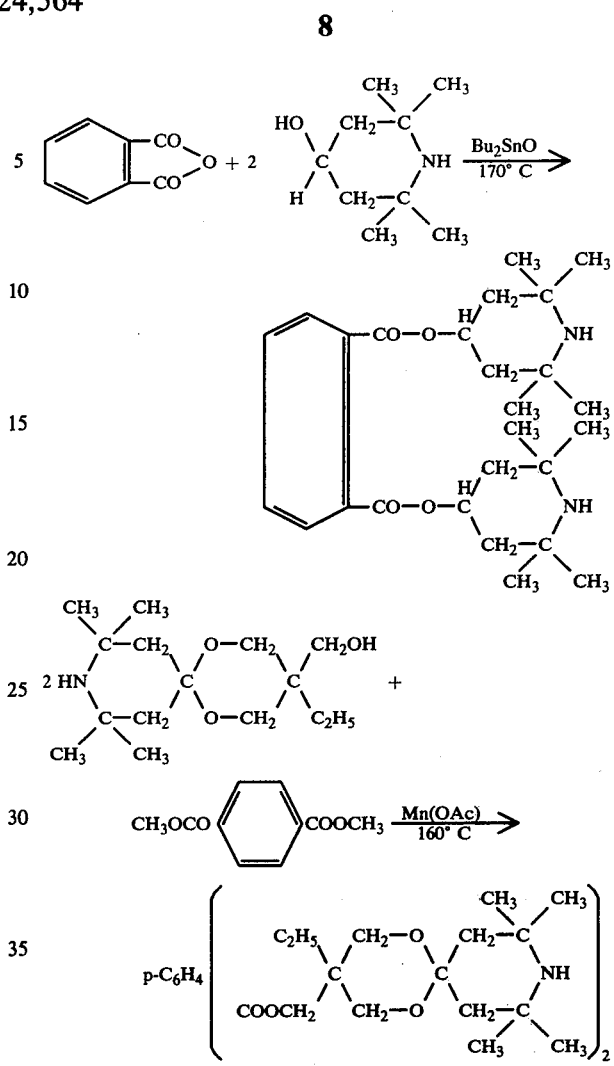

Conventional esterification and transesterification conditions can be used. Esterification and transesterification catalysts that can be used include acids, alkalies, and metallic as well as organometallic oxides, hydroxides, alkoxides, carboxylates, and combinations of these. Particularly preferred direct esterification catalysts are sulfonic acids and dialkyltin oxides and carboxylates. Particularly preferred transesterification catalysts are antimony oxide, carboxylate salts of cobalt, lead, tin, manganese, and zinc, and alkoxides of aluminum, titanium, and zirconium.

In some preparations of 2,2,6,6-tetramethylpiperidine esters certain steps of the process can be merged or rearranged in sequence. For example, a 2,2,6,6-tetramethylpiperidine ester for the stabilizer composition of this invention can be prepared directly from a trihydric alcohol monocarboxylate ester and 2,2,6,6-tetramethylpiperidine-4-one, as shown for glyceryl 1-monobenzoate:

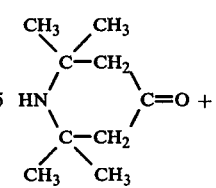

-continued

HOCH$_2$CHOHCH$_2$OCOC$_6$H$_5$ $\xrightarrow[\text{Acid Catalyst}]{80-110° C}$

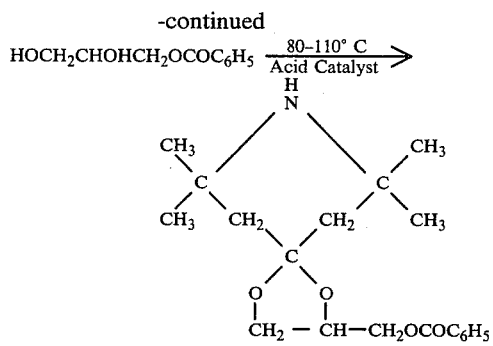

It is also possible to avoid the isolation of 2,2,6,6-tetramethylpiperidine-4-one from the crude product of the ammonia-acetone reaction (so-called triacetonamine) which contains the 4-piperidinone together with isomeric compounds. During the acid-catalyzed reaction of the piperidone with trihydric alcohol to give 4-position linked oxygen heterocyclic alcohol, some of the isomers present in a crude 2,2,6,6-tetramethylpiperidine-4-one or triacetonamine also react with the trihydric alcohol to give the same desired alcohol product, thus increasing the yield and simplifying the procedure.

2,2,6,6-tetramethylpiperidine esters in the 1-oxyl radical form are prepared from the corresponding piperidine by oxidation, suitably with a peracid such as peracetic acid, perphthalic acid or m-chloroperbenzoic acid.

The carbonate ester is a carbonate of a dihydric or trihydric phenol characterized by certain essential structural features necessary for the synergistically enhanced stabilizing effectiveness in the stabilizer composition of this invention. These features are a controlled molecular weight in a range such that the carbonate ester is low in volatility and still sufficiently mobile in the polymer being stabilized for optimum effectiveness, which corresponds to a molecular weight range from 400 to about 4000; and preferably in each benzenoid ring of the esterified dihydric or trihydric phenol one to two alkyl, cycloalkyl, or aralkyl groups having 1 to 10 carbon atoms of which at least one is positioned ortho to a phenolic hydroxyl group which can be a free hydroxyl or a carbonate ester. These recited features are beneficial to the observed effectiveness in the stabilizer composition with the 2,2,6,6-tetramethylpiperidine ester according to this invention. For reasons that are not well understood the greatest stabilizing effectiveness in the composition of this invention is associated with carbonate esters having an odd number of benzenoid rings in the dihydric or trihydric phenol.

A preferred class of carbonate ester components of the stabilizer composition of this invention is derived from ortho-substituted 1,3- and 1,4-dihydric phenols having one benzenoid ring such as 2,5-di-t-butylhydroquinone, 2,3,6-trimethylhydroquinone, 2-methylresorcinol, and 2,6-di-t-butylresorcinol.

Also useful carbonate ester components of the stabilizer composition are carbonate esters of bisphenols, preferably ortho-substituted bisphenols, having two phenolic groups linked directly or through a two valent hydrocarbon group such as 2,2'-methylene bis(4-methyl-6-t-butyl-phenol), 2,2'-methylene bis(4-ethyl-6-t-butylphenol), 2,2'-methylene bis(4-methyl-6-(1-methylcyclohexyl) phenol), 2,2'-n-butylidene bis(4,6-dimethylphenol), bis-1, 1-(2'-hydroxy-3',5'-dimethylphenyl)-3,5,5-trimethylhexane, 2,2'-cyclohexylidene bis(4-ethyl-6-t-butylphenol), 2,2'-isopropylbenzylidene bis(4-ethyl-6-t-butylphenol), 4,4'-bis(2,6-di-t-butylphenol), 4,4-methylene bis(2,6-di-t-butylphenol), 4,4'-isopropylidene bis(2-phenylethylphenol), 4,4'-n-butylidene bis(3-methyl-6-t-butylphenol), 4,4'-cyclohexylidene bis(2-t-butylphenol), 4,4'-cyclohexylidene bis(2-cyclohexphenol), 4,4'-benzylidene bis(2-t-butyl-5-methylphenol), and 2,2-bis(p-hydroxyphenyl)propane.

Another preferred class of carbonate esters that can be used in the composition of this invention is the class of carbonate esters of bisphenols, preferably ortho-substituted bisphenols, having two phenolic groups linked through oxygen or sulfur, such as 4,4'-oxobis (3-methyl-6-isopropylphenol), 4,4'-thiobis(2-methyl-6-t-butylphenol), 4,4'-thiobis(3-methyl-6-t-butylphenol), 4,4'-sulfobis(3-methyl-6-t-butylphenol), bis(2-methyl-4-hydroxy-5-t-butylbenzyl) sulfide, bis(3,5-di-t-butyl-4-hydroxy benzyl) sulfide, 2,2'-thiobis(4-t-butyl-6-methylphenol), 2,2'-thiobis(4-methyl-6-t-butyl-phenol), 2,2'-thiobis(4,6-di-t-butylphenol), and 4,4'-thiobisphenol.

A particularly preferred class of carbonate ester components of the stabilizer composition is the class of carbonate esters of ortho-substituted trisphenols having three ortho-substituted phenolic groups, such as 1,1,3-tris(2'-methyl-4'-hydroxy-5'-t-butylphenyl)butane, 1,3,5-tris(3',5'-di-t-butyl-4'-hydroxybenzyl)-2,3,6-trimethylbenzene, 2,2-bis(3'-t-butyl-4'-hydroxyphenyl)-4-(3'',5''-di-t-butyl-4''-hydroxyphenyl)butane, and 2,2-bis(2'-methyl-5'-t-butyl-4'-hydroxyphenyl)-4-(3'',5''-di-t-butyl-4''-hydroxyphenyl)butane.

The most preferred group of carbonate esters used in stabilizer compositions of this invention is defined by the formula

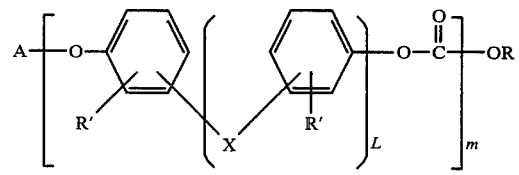

in which independently at each occurrence R' is selected from the group consisting of alkyl, cycloalkyl and arylalkyl radicals, and hydrogen and A is selected from the group consisting of hydrogen and

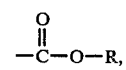

R is selected from the group consisting of alkyl, aryl, alkaryl, aralkyl, cycloalkyl and

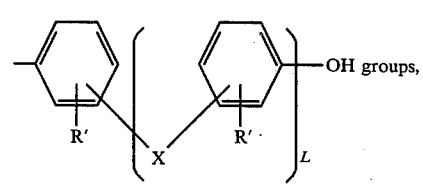

OH groups,

X is selected from the group consisting of —S—,

—CH$_2$SCH$_2$—, —O—, a single bond, a divalent hydrocarbon radical, and

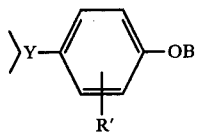

where
Y is a trivalent hydrocarbon radical, B is a hydrogen atom or the group

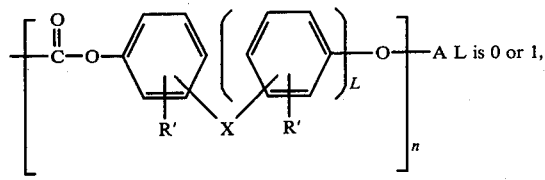 A L is 0 or 1, $m$ is 1 to about 20, and $n$ is an average of 0.1 to about 20.

Alkyl groups R' have 1 to 10 carbon atoms; cycloalkyl R' groups have 5 to 10 carbon atoms and aralkyl groups R' have 7 to 10 carbon atoms.

Carbonate esters used in the stabilizer composition of this invention can be prepared by conventional methods by the reaction of a carbonylating agent such as phosgene, a chloroformate ester, a dialkyl carbonate or a diaryl carbonate with the desired ortho-substituted dihydric or trihydric phenol in one or several reaction stages. Acid acceptors such as ammonia, pyridine, organic amines, and inorganic alkalies can be used with phosgene and chloroformate esters, and acidic or alkaline transesterification catalysts can facilitate the reaction of alkyl and aryl carbonate esters. The molecular weight of the carbonate ester is regulated by the proportions of carbonylating agent to ortho-substituted dihydric or trihydric phenol. Thus the product of the reaction between two moles of a dihydric phenol and one mole of carbonylating agent is a relatively low molecular weight mixture of carbonate esters in which the bis(hydroxyaryl carbonate) of the dihydric phenol predominates, and the product of the reaction between two moles of a carbonate ester carbonylating agent (e.g. diphenyl carbonate) and one mole of dihydric phenol is a relatively low molecular weight mixture of carbonate esters in which the dihydric phenol bis(phenyl carbonate) ester predominates. The more closely the proportions of carbonylating agent and dihydric or trihydric phenol approach one equivalent of each reactant the higher the molecular weight of the resulting product. In polycarbonates prepared with an excess of the dihydric or trihydric phenol reactant over the carbonylating agent the polycarbonate is predominantly terminated by hydroxyaryl groups while in polycarbonates prepared with an excess of the carbonylating agent over the phenol carbonate ester termination predominates. The hydroxyaryl terminated polycarbonates of average molecular weight ranging from 400 to about 4000 are preferred.

Useful preparative techniques for carbonate esters derived from polyhydric phenols can be found in the disclosures of U.S. Pat. Nos. 3,000,849; 3,028,365 and 3,510,507, as well as the review by L. Bottenbruch in "Encyclopedia of Polymer Science and Technology" (N. Bikales, ed.) Volume 10, pages 714–725 (J. Wiley-Interscience Publishers, New York 1969).

Synthetic resins that can be stabilized with compositions comprising a 2,2,6,6-tetramethylpiperidine ester and a carbonate ester according to this invention include alphaolefin polymers such as polyethylene, polypropylene, polybutene, poly-3-methylbutene, or copolymers thereof such as ethylene-vinylacetate copolymer, ethylenepropylene copolymer, polystyrene, polyvinylacetate, acrylic ester resins, copolymers from styrene and another monomer (for example, maleic anhydride, butadiene, acrylonitrile and so on), acrylonitrile-butadiene-styrene copolymer, acrylic acid ester-butadiene-styrene copolymer, methacrylic acid ester-butadiene-styrene copolymer, methacrylate ester resin such as polymethylmethacrylate, polyvinylalcohol, ethylene and butylene terephthalate polyesters, polyamide, polycarbonate, polyacetal, polyurethane, cellulosic resin, or phenolic resin, urea resin, melamine, resin, epoxy resin, unsaturated polyester, silicone resin, halogen-containing resins such as polyvinyl chloride, polyvinylidene chloride, polyvinylidene fluoride and copolymers thereof, and further rubbers such as isoprene rubber chloroprene rubber, and blends of the above resins.

Stabilizer compositions comprising a 2,2,6,6-tetramethylpiperidine ester and a carbonate ester according to this invention can be formulated and marketed in liquid, solid, and paste forms. An inert solvent can be used to facilitate handling. The 2,2,6,6-tetramethylpiperidine ester and carbonate ester can also be solubilized in one another by heating, such as at 70°–160° C. for up to 4 hours, and then allowing the resulting melt to cool and harden sufficiently to be flaked and ground.

Known polymer stabilizers can be used in synthetic resin compositions together with the stabilizer compositions of this invention and can be admixed with the latter. Such known stabilizers include thiodipropionic acid esters, polyvalent metal salts of carboxylic acids, organic phosphites, and 1,2-epoxides.

Representative thiodipropionic acid esters include di-n-dodecyl thiodipropionate, dihexadecyl thiodipropionate, distearyl thiodipropionate, n-octyl eicosanyl thiodipropionate and n-octadecyl cyclohexane-1,4-dimethanol thiodipropionate polyester. A comprehensive disclosure of useful thiodipropionate esters by M. Minagawa et al in U.S. Pat. No. 3,869,423, column 17 line 55 to column 19 line 54 is here incorporated by reference.

Representative polyvalent metal salts include zinc, calcium, magnesium, barium, strontium and nickel salts of monocarboxylic acids having 6 to 24 carbon atoms, for example zinc benzoate, calcium palmitate, and nickel 2-ethylbutyrate. A comprehensive disclosure of useful metal salts by M. Minagawa et al in U.S. Pat. No. 3,869,423, column 19 line 56 to column 20 line 35 is here incorporated by reference.

Representative organic phosphites include triisodecylphosphite, tris (nonylphenyl phosphite), and 4,4'-isopropylidene diphenol $C_{12}$–$C_{15}$ mixed alkyl phosphite. A comprehensive disclosure of useful organic phosphites by M. Minagawa et al in U.S. Pat. No. 3,849,370 Column 13 line 63 to column 16 line 48 is here incorporated by reference.

Representative 1,2-epoxides include epoxysoybean oil, epoxylinseed oil, and 2-ethylhexyl epoxystearate. A comprehensive disclosure of 1,2-epoxides by M. Minagawa et al in U.S. Pat. No. 3,869,423 column 26 line 13 to line 39 is here incorporated by reference.

The preparation of the stabilized resin composition is easily accomplished by conventional procedures. A heated two roll mill, for example, is a convenient compounding tool for blending stabilizer compositions of the invention with polyolefins, vinyl chloride polymers, ABS polymers, ethylene-vinyl acetate copolymers and others.

In the examples that follow, each stabilizer composition of the invention includes a 2,2,6,6-tetramethylpiperidine ester from among those listed by name, formula and reference number in Table 1, and a dihydric and trihydric phenol carbonate ester from among those listed by molar proportions of reactants used in their preparation, approximate molecular weight, formula and reference number in Table 2. For the sake of brevity the reference numbers from Table 1 and Table 2 respectively are used in place of the names or formulae of the 2,2,6,6-tetramethylpiperidine esters (referred to in the column headings of Table 3 through Table 10 as piperidine compounds) and the dihydric anc trihydric phenol carbonate esters (referred to in column headings as carbonate oligomer compounds) to record the results of the stability tests in Tables 3 to 11. Compounds used instead of a 2,2,6,6-tetramethylpiperidine-4-alcohol ester in stabilizer compositions not according to this invention for comparison purposes are also grouped under the heading "Piperidine Compounds" in each of Tables 3 to 10 while the "Carbonate Oligomer Compounds" column in each such Table groups together carbonate esters and other compounds used in their place in stabilizer compositions not of this invention.

TABLE 1: 2,2,6,6-Tetramethylpiperidine-4-alcohol carboxylic acid ester stabilizers No. 1

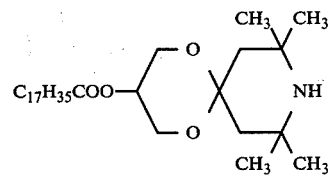

4,4(2'-Stearyloxy-1',3'-propanedioxy)-2,2,6,6-tetramethylpiperidine 2.82 weight percent piperidine nitrogen.

No. 2

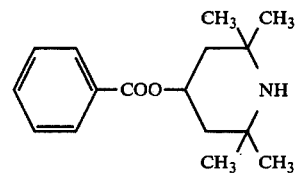

2,2,6,6-tetramethylpiperidine-4-yl benzoate 5.36 weight percent piperidine nitrogen.

No. 3

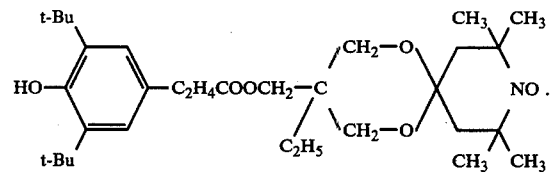

4,4(2'-Ethyl-2'(3,5-di-t-butyl-4-hydroxyhydrocinnamoyloxymethyl)1',3'-propanedioxy)2,2,6,6-tetramethylpiperidine-1-oxyl radical 2.56 weight percent piperidine nitrogen.

No. 4

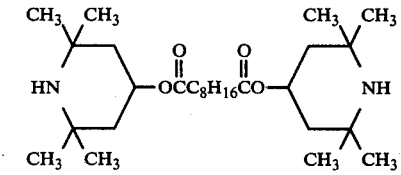

Bis(2,2,6,6-tetramethylpiperidine-4-yl) 1,10-decanedioate 5.83 weight percent piperidine nitrogen.

No. 5

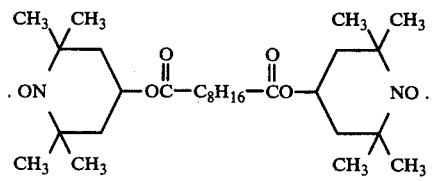

4,4'-Bis(2,2,6,6-tetramethylpiperidine-1-oxyl radical) 1,10-decanedioate 5.49 weight percent piperidine nitrogen.

No. 6

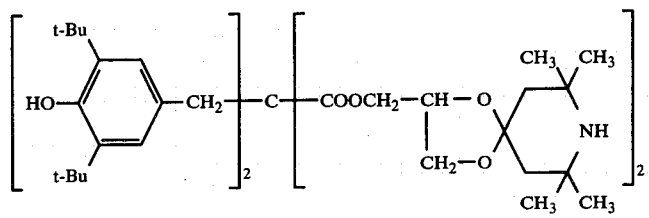

Bis(2,3(2',2',6',6'-tetramethylpiperidine-4',4'-dioxy)-propyl)2,2-bis(3',5'-di-t-butyl-4'-hydroxybenzyl)malonate 2.95 weight percent piperidine nitrogen.

No. 7

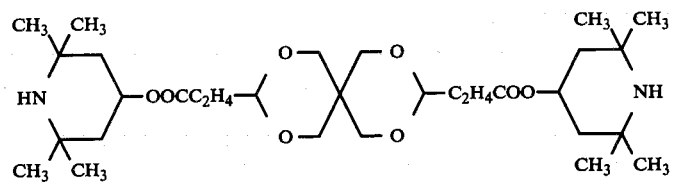

Bis(2,2,6,6-tetramethylpiperidine-4-yl) 1,3,7,9-tetraoxa-5,5-spirobiundecane-2,8-dipropionate 5.04 weight percent piperidine nitrogen.

No. 8

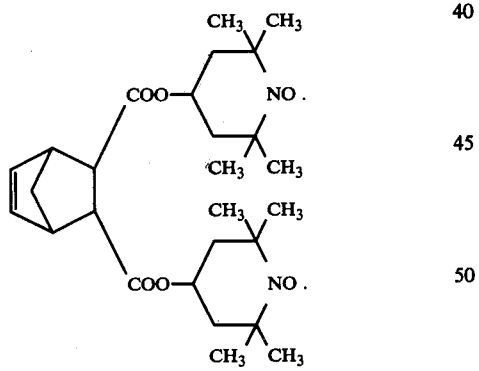

4,4'-Bis(2,2,6,6-tetramethylpiperidine oxyl radical)-2,2,1-bicyclohept-5-ene-2,3-dicarboxylate 5.71 weight percent piperidine nitrogen.

No. 9

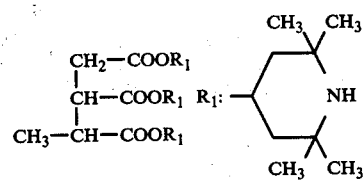

Tris(2,2,6,6-tetramethylpiperidine-4-yl)butane-1,2,3-tricarboxylate 6.92 weight percent piperidine nitrogen.

No. 10

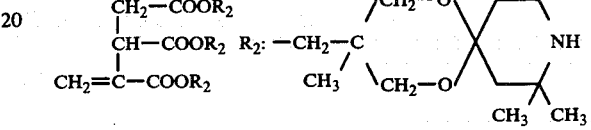

Tris(2,2,6,6-tetramethylpiperidine-4,4(1',3'-dioxyisobutane-2-methyl)) but-3-ene-1,2,3-tricarboxylate 4.70 weight percent piperidine nitrogen.

No. 11

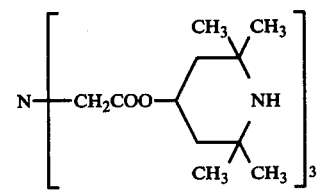

Tris(2,2,6,6-tetramethylpiperidine-4-yl) N,N,N, nitrilotriacetate 6.91 weight percent piperidine nitrogen.

No. 12

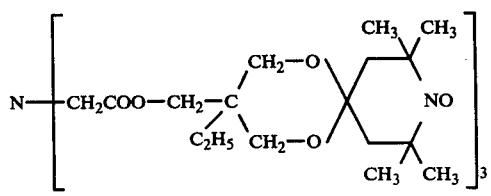

4,4,4-Nitrilotris(2'-acetoxymethyl-2'-ethyl-1',3'-propanedioxy-2,2,6,6-tetramethylpiperidine-1-oxyl radical) 4.22 weight percent piperidine nitrogen.

No. 13

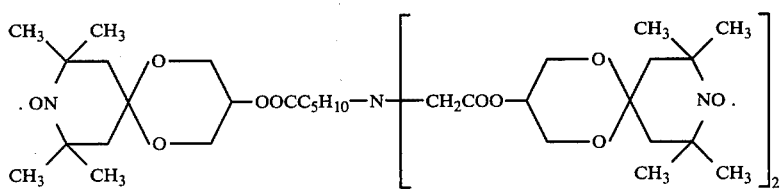

4,4(6-iminodi(acet-2'-oxy-1',3'-propanedioxy)2,2,6,6-tetramethylpiperidine-1-oxy radical)hexanoyloxy-1',3'propanedioxy)2,2,6,6-tetramethylpiperidine-1-oxyl radical 4.54 weight percent piperidine nitrogen.

No. 14

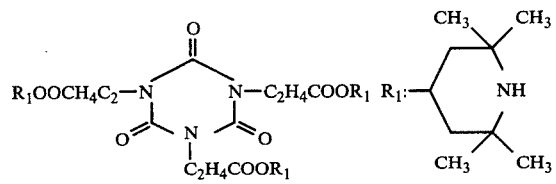

Tris(2,2,6,6-tetramethylpiperidine-4-yl) triazine-2,4,6-trione-1,3,5-tripropionate 5.51 weight percent piperidine nitrogen.

No. 15

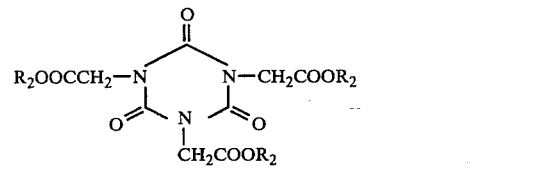

2,4,6-triazinetrione-1,3,5-tris(4',4'(2-acetoxymethylisobutane-1-3-dioxy)2',2',6',6'-tetramethylpiperidine) 4.12 weight percent piperidine nitrogen.

No. 16

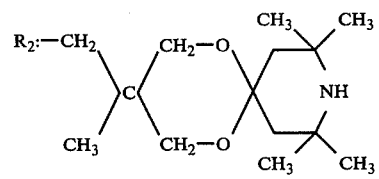

Tris(2,2,6,6-tetramethylpiperidine-4-yl) trimesate 6.25 weight percent piperidine nitrogen.

No. 17

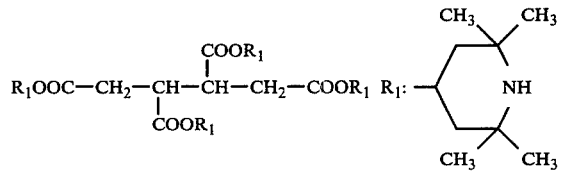

Tetrakis(2,2,6,6-tetramethylpiperidine-4-yl) butane-1,2,3,4-tetracarboxylate 7.08 weight percent piperidine nitrogen.

No. 18

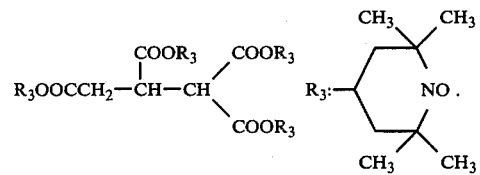

4,4',4'',4'''-tetrakis(2,2,6,6-tetramethylpiperidine-1-oxyl radical) propane-1,1,2,5,-tetracarboxylate 6.70 weight percent piperidine nitrogen.

No. 19

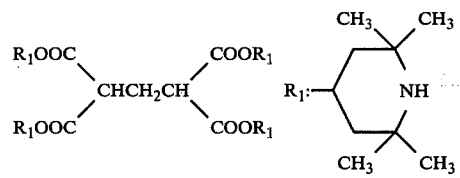

Tetrakis(2,2,6,6-tetramethylpiperidine-4-yl)propane-1,1,3,3-tetracarboxylate 7.22 weight percent piperidine nitrogen.

No. 20

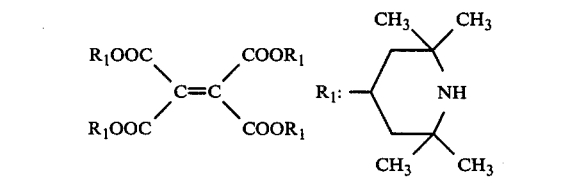

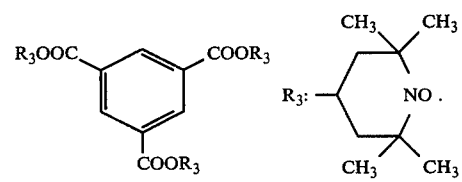

Tetrakis(2,2,6,6-tetramethylpiperidine-4-yl)ethene-1,1,2,2-tetracarboxylate 7.36 weight percent piperidine nitrogen.

No. 21

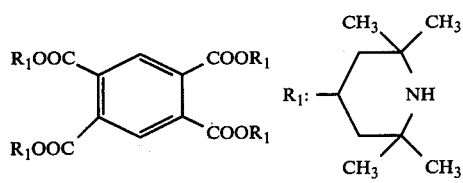

Tetrakis(2,2,6,6-tetramethylpiperidine-4-yl)promellitate 6.91 weight percent piperidine nitrogen.

No. 22

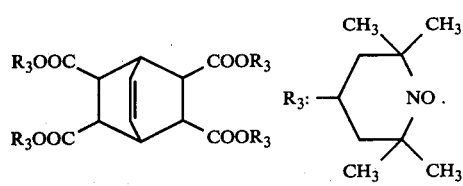

4,4′,4″,4‴-Tetrakis(2,2,6,6-tetramethylpiperidine-1-oxyl radical) (2.2.2.) bicyclooct-7-ene-2,3,5,6-tetracarboxylate 6.22 weight percent piperidine nitrogen.

No. 23

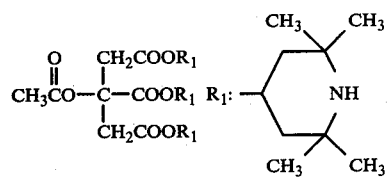

Tris(2,2,6,6-tetramethylpiperidine-4-yl)-2-acetoxypropane-1,2,3-tricarboxylate 6.45 weight percent piperidine nitrogen.

No. 24

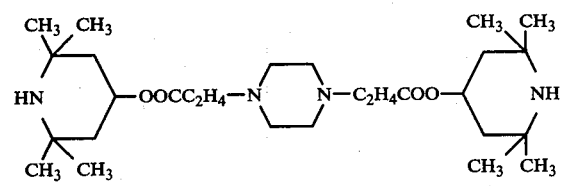

Bis(2,2,6,6-tetramethylpiperidine-4-yl)piperazine-1,4-dipropionate 5.51 weight percent piperidine nitrogen.

No. 25

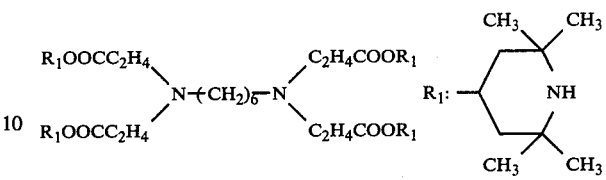

N,N,N′,N′-Tetrakis(2,2,6,6-tetramethylpiperidine-4-yl)hexamethylenediaminetetrapropionate 5.83 weight percent piperidine nitrogen.

TABLE 2 — Carbonate Ester Stabilizers

Carbonate ester 1:
2,5-Di-t-butylhydroquinone/diphenyl carbonate, 8:7 molar ratio

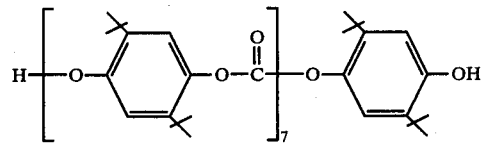

Approximate molecular weight 2100

Carbonate ester 2:
2,5-Di-t-butylhydroquinone/diphenyl carbonate, 9:10 molar ratio

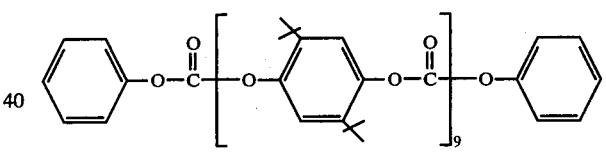

Approximate molecular weight 2400

Carbonate ester 3:
4,4′-Methylenebis(2-t-butyl-6-methylphenol)/diphenyl carbonate, 3:2 molar ratio

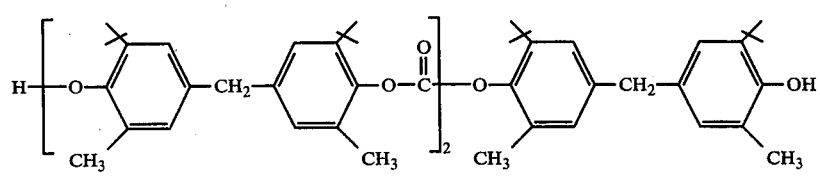

Approximate molecular weight 1100

Carbonate ester 4:
4,4′-Butylidenebis(2-t-butyl-5-methylphenol)/diphenyl carbonate, 2:1 molar ratio

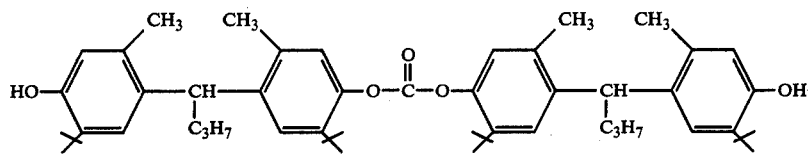

Approximate molecular weight 2300

Carbonate ester 7:
4,4′-Thiobis(2-t-butyl-5-methylphenol)/diphenyl carbonate, 4:3 molar ratio

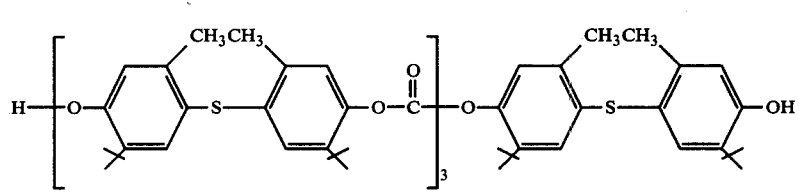

Approximate molecular weight 700

Carbonate ester 5:
4,4′-Butylidenebis(2-t-butyl-5-methylphenol)/diphenyl carbonate, 4:3 molar ratio

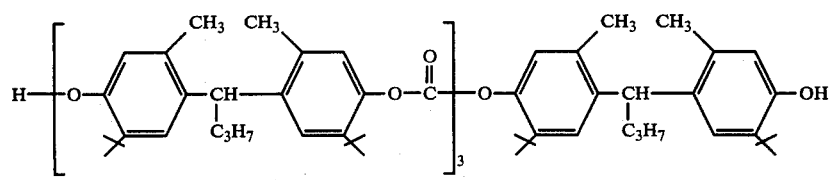

Approximate molecular weight 1500

Carbonate ester 8:
4,4′-Thiobis(2-t-butyl-5-methylphenol)/diphenyl carbonate, 2:3 molar ratio

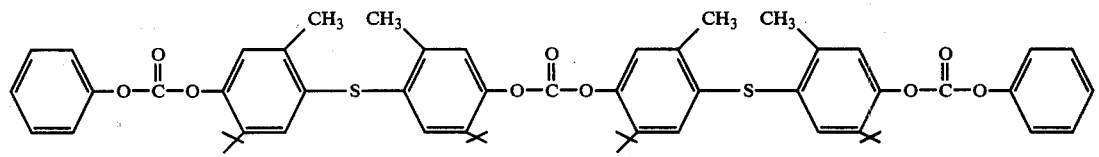

Approximate molecular weight 1500

Carbonate ester 6:
4,4′-Butylidenebis(2-t-butyl-5-methylphenol)/diphenyl carbonate, 6:5 molar ratio

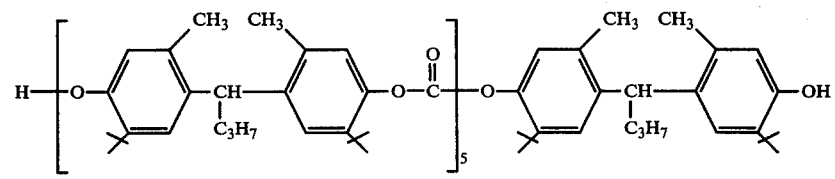

Approximate molecular weight 1000

Carbonate ester 9:
Bis(2-methyl-4-hydroxy-5-t-butylbenzyl) sulfide/diphenyl carbonate, 8:7 molar ratio

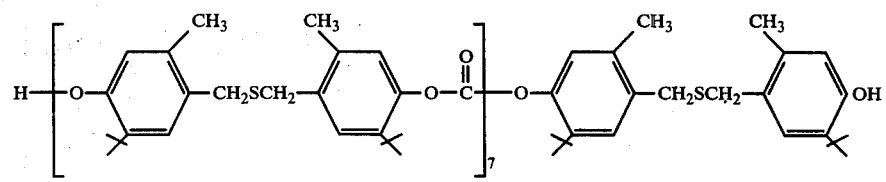

Approximate molecular weight 2400

Carbonate ester 10:
Bis(2-methyl-4-hydroxy-5-t-butylbenzyl)
sulfide/diphenyl carbonate, 4:3 molar ratio Approximate molecular weight 2300

Carbonate ester 12:
4,4'-Cyclohexylidenebis(2-cyclohexylphenol)/diethyl
carbonate, 5:6 molar ratio

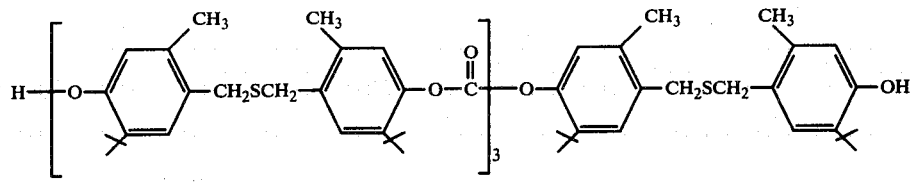

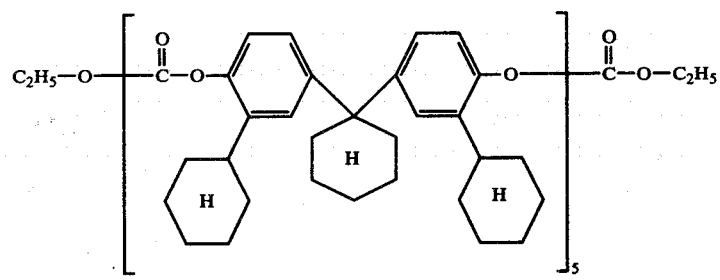

Approximate molecular weight 1600

Carbonate ester 11:
4,4'-Cyclohexylidenebis(2-cyclohexylphenol)/diphenyl
carbonate, 5:4 molar ratio Approximate molecular weight 2400

Carbonate ester 13:
2,2'Methylenebis(4-methyl-6-t-butylphenol)/diphenyl
carbonate, 3:2 molar ratio

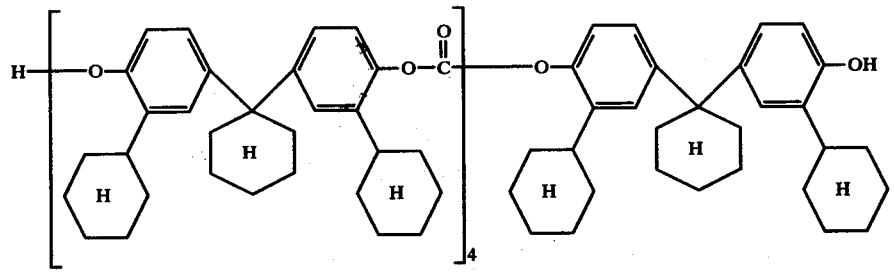

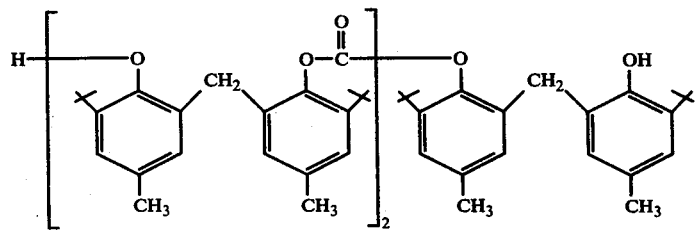

Approximate molecular weight 1100

Carbonate ester 14:
2,2'-Methylenebis(4-methyl-6-t-butylphenol)/diphenyl carbonate, 6:5 molar ratio

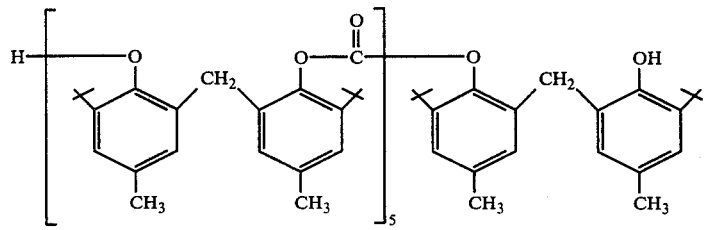

Approximate molecular weight 2200

Carbonate ester 15:
1-(3',5'-Di-t-butyl-4'-hydroxyphenyl)-3,3-di(3'-t-butyl-4'-hydroxyphenyl)butane/diphenyl carbonate, 2:1 molar ratio

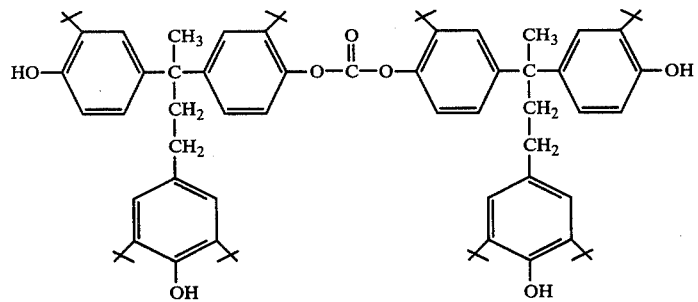

Approximate molecular weight 1100

Carbonate ester 16:
1-(3',5'-Di-t-butyl-4'-hydroxyphenyl)-3,3-di(3'-t-butyl-4'-hydroxyphenyl)butane/diphenyl carbonate, 4:3 molar ratio

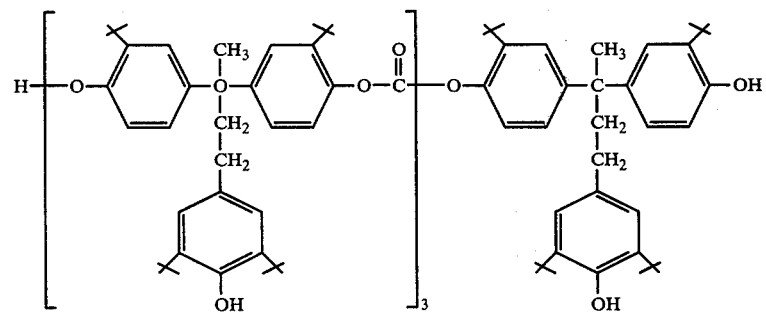

Approximate molecular weight 2200

Carbonate ester 17:
1-(3',5'-Di-t-butyl-4'-hydroxyphenyl)-3,3-di(3'-t-butyl-4'-hydroxyphenyl)butane/diphenyl carbonate, 8:7 molar ratio

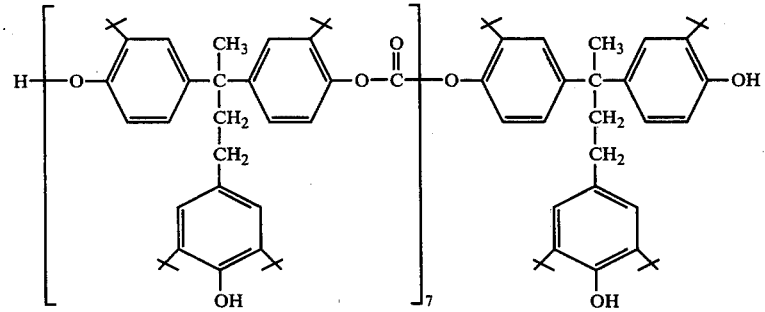

Approximate molecular weight 3700

Carbonate ester 18:
1,1,3-Tris(2'-methyl-4'-hydroxy-5'-t-butylphenyl)-
butane/diphenyl carbonate, 2:1 molar ratio Approximate molecular weight 2700

Carbonate ester 20:
4,4'-Thiobis(2-t-butyl-6-methylphenol/diphenyl
carbonate, 2:1 molar ratio

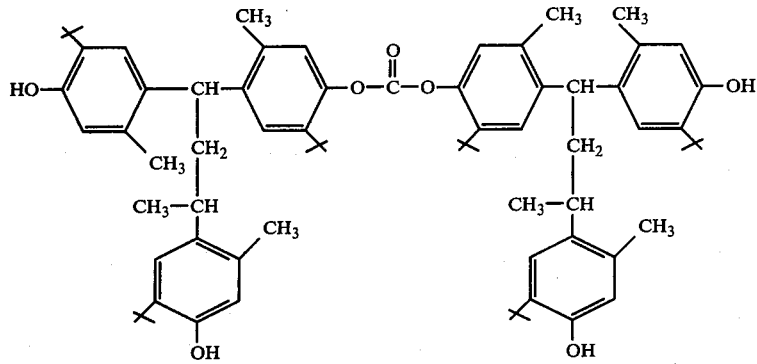

Approximate molecular weight 1100

Carbonate ester 19:
1,1,3-Tris(2'-methyl-4'-hydroxy-5'-t-butylphenyl)-
butane/diphenyl carbonate, 5:4 molar ratio

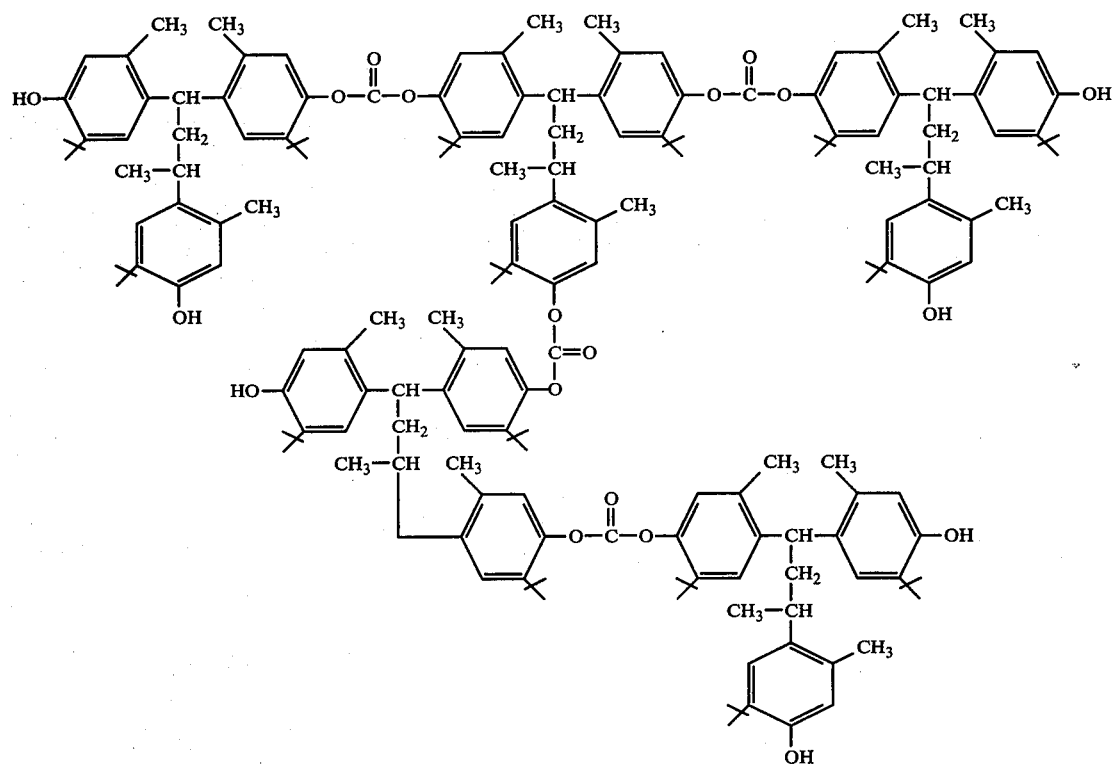

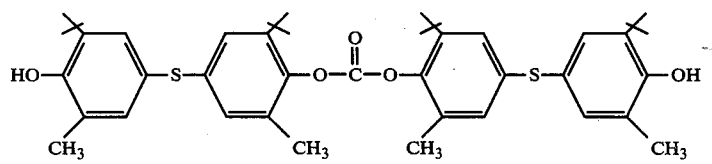

Approximate molecular weight 700

Carbonate ester 21:
4,4'-Butylidenebis(2-t-butyl-5-methylphenol/4,4'-thi-obis(2-t-butyl-5-methyl)phenol bischloroformate, 3:2 molar ratio

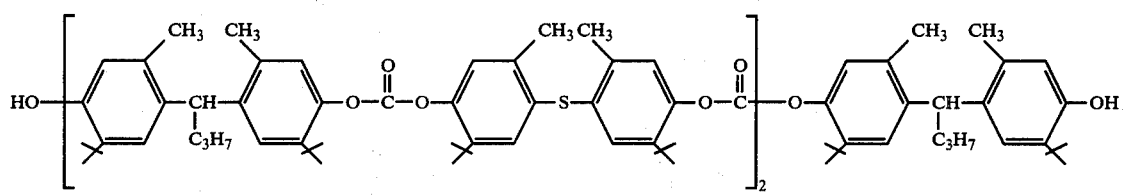

Approximate molecular weight 2000

Carbonate ester 22:
2,2,-bis(p-hydroxyphenyl)propane/diphenyl carbonate, 3:2 molar ratio

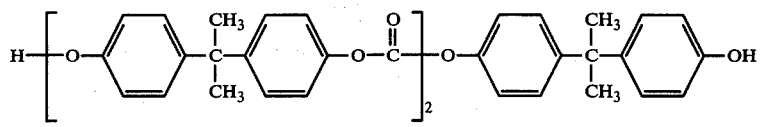

Approximate molecular weight 700

Carbonate ester 23:
2,2-bis(p-hydroxyphenyl)propane/diphenyl carbonate, 6:5 molar ratio

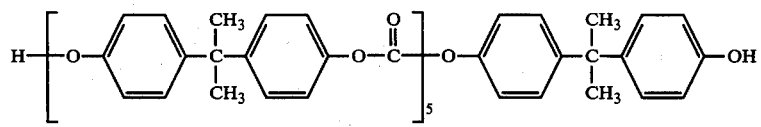

Approximate molecular weight 1500

EXAMPLE - 1

| | |
|---|---|
| Polyvinylchloride resin | 100 parts by weight |
| DOP | 50 |
| Ca-stearate | 1.0 |
| Zn-stearate | 0.1 |
| 2,2,6,6-tetramethylpiperidine ester | 0.5 |
| Carbonate oligomer | 1.0 |

The above formulation was milled on a 2-roll mill and sheeted off 1mm in thickness. Portions of each sheet were used for light exposure tests carried out in the weatherometer and for heat stability tests in a Geer forced draft air oven at 175° C. The results are shown in TABLE-3.

The measurement of resistance to light is expressed as the number of hours in the weatherometer until the sample failed by spotting, discoloration, stiffening, or becoming tacky. The heat stability measurement is expressed as the number of minutes in the air oven until the sample failed by a black, brown, or deep red discoloration.

TABLE - 3

| No. | Piperidine Compounds | Carbonate Oligomer Compounds | Resistance to Light (Hrs.) | Heat Stability (min) |
|---|---|---|---|---|
| CONTROL | | | | |
| 1-1 | None | None | 270 | 45 |
| 1-2 | None | No. 10 (Table-2) | 290 | 60 |
| 1-3 | No. 5 (Table-1) | None | 530 | 60 |
| EXAMPLE | | | | |
| 1-1 | No. 3 | No. 4 | 680 | 90 |
| 1-2 | No. 5 (Table-1) | No. 18 (Table-2) | 850 | 105 |
| 1-3 | No. 9 (Table-1) | No. 22 (Table-2) | 860 | 120 |
| 1-4 | No. 13 (Table-1) | No. 15 (Table-2) | 760 | 120 |
| 1-5 | No. 18 (Table-1) | No. 17 (Table-2) | 810 | 120 |
| 1-6 | No. 21 (Table-1) | No. 8 (Table-2) | 790 | 105 |
| 1-7 | No. 24 (Table-1) | No. 10 (Table-2) | 880 | 105 |

The results of the three Control tests show that the carbonate oligoester of 2-methyl-4-hydroxy-5-t-butyl-benzyl sulfide(carbonate oligomer No. 10) has a modest effectiveness in increasing the heat stability and a very slight effectiveness in increasing the resistance to light of the base formulation. Bis(2,2,6,6-tetramethylpiperidine oxyl radical-4-yl) sebacate, piperidine compound No. 5 as used in Control 1-3, increases the resistance to light of the base formulation and has a modest effectiveness in increasing the heat stability. With the small contribution to both heat and light stability of the carbonate oligomer alone it is surprising that each composition including both 2,2,6,6-tetramethylpiperidine ester and carbonate oligomer is from 50% to 100% better in heat stability than the best control composition and from 28% to 66% better in resistance to light.

EXAMPLE 2

| | |
|---|---|
| Polypropylene | 100 parts by weight |
| Dilaurylthiodipropionate | 0.3 |
| 2,2,6,6-tetramethylpiperidine ester | 0.3 |

-continued

| | |
|---|---|
| Carbonate oligomer | 0.1 |

The above compound was kneaded on roll, and then a sheet of 0.5mm in thickness was prepared by compression molding. Resistance for light exposure of the sheet was examined in the weatherometer, and the heat stability in an air circulating oven at 160° C. was measured.

The results are shown in TABLE-4.

Resistance to light was measured in hours of exposure until the sample could no longer be bent through an arc of 180° without breaking. Heat stability was measured in hours to a failure point represented by the sample becoming brittle at corners or edges.

TABLE 4

| No. | Piperidine Compounds | Carbonate Oligomer Compounds | Resistance to Light (hrs.) | Heat Stability hrs. |
|---|---|---|---|---|
| Control | | | | |
| 2-1 | None | No. 5 (Table-2) | 250 | 730 |
| 2-2 | 2-hydroxy-4-methoxy-benzophenone | No. 16 (Table -2) | 340 | 700 |
| 2-3 | No. 10 (Table-1) | Stearyl-B-(3,5-di-t-butyl-4-hydroxyphenyl) propionate | 530 | 310 |
| Example | | | | |
| 2-1 | No. 4 (Table-1) | No. 6 (Table-2) | 740 | 910 |
| 2-2 | No. 10 (Table-1) | No. 19 (Table-2) | 760 | 890 |
| 2-3 | No. 11 (Table-1) | No. 5 (Table-2) | 830 | 970 |
| 2-4 | No. 15 (Table-1) | No. 23 (Table-2) | 800 | 940 |
| 2-5 | No. 17 (Table-1) | No. 16 (Table-2) | 820 | 1,010 |
| 2-6 | No. 20 (Table-1) | No. 1 (Table-2) | 710 | 820 |
| 2-7 | No. 23 (Table-1) | No. 12 (Table-2) | 790 | 880 |

The results in Table 4 demonstrate the synergistic interaction of the 2,2,6,6-tetramethylpiperidine ester and carbonate oligomer ingredients of the stabilizer composition of the invention. Example 2-2 of the invention can be compared with Control 2-3 where the same piperidine compound (No. 10) is used with a phenolic antioxidant instead of carbonate oligomer according to this invention. Example 2-2 unexpectedly demonstrates 43% better resistance to light and 187% better heat stability than Control 2-3. Similarly, Example 2-5 can be directly compared with Control 2-2 which uses the same carbonate oligomer with a 2-hydroxy benzophenone type light stabilizer instead of a piperidine compound of the invention. Example 2-5 unexpectedly demonstrates 141% better resistance to light and 44% better heat stability than Control 2-2.

EXAMPLE 3

| | |
|---|---|
| Ethylene-vinylacetate copolymer resin | 100 parts by weight |
| Montan wax ester lubricant | 0.3 |
| 2,2,6,6-tetramethylpiperidine ester | 0.25 |
| Carbonate oligomer | 0.25 |

The above compound was milled on a 2-roll mill and molded to give a sheet of 1.0mm in thickness. The sheet was irradiated in the weatherometer for 500 hrs., and the retention of tensile strength was determined. There were also measured heat stability and initial color in a Geer oven at 175° C. With regard to initial color, yellowness was determined by the Hunter color meter.

The results are shown in Table-5. "Tension" in the table refers to tensile strength.

Table - 5

| No. | Piperidine Compounds | Carbonate Oligomer Compounds | Retention of Tension % | Heat Stability min | Initial Color |
|---|---|---|---|---|---|
| Control | | | | | |
| 3-1 | None | None | 52 | 60 | 33 |
| 3-2 | None | No.11 (Table-2) | 56 | 120 | 18 |
| 3-3 | No.7 (Table-1) | None | 68 | 60 | 27 |
| 3-4 | No.16 (Table-1) | 4,4'-n-butylidene bis(2-t-butyl-5-methyl-phenol) | 70 | 90 | 23 |
| Example | | | | | |
| 3-1 | No.2 (Table-1) | No.14 (Table-2) | 76 | 120 | 13 |
| 3-2 | No.7 (Table-1) | No.9 (Table-2) | 80 | 150 | 10 |
| 3-3 | No.11 (Table-1) | No.21 (Table-2) | 82 | 150 | 9 |
| 3-4 | No.16 (Table-1) | No.3 (Table-2) | 78 | 120 | 12 |
| 3-5 | No.19 (Table-1) | No.11 (Table-2) | 79 | 135 | 10 |
| 3-6 | No.25 (Table-1) | No.7 (Table-2) | 80 | 135 | 11 |

The results of the tests in Table 5 demonstrate the synergistic interaction of the 2,2,6,6-tetramethylpiperidine ester and carbonate oligomer ingredients in the stabilizer composition of the invention. Each polymer sample containing a stabilizer composition according to the invention had greater retention of tensile strength after 500 hrs. irradiation, better initial color, and better heat stability at 175° C. than any of the control stabilizer systems lacking one of the essential ingredients according to the invention.

EXAMPLE 4

| | |
|---|---|
| Polyethylene | 100 parts by weight |
| Ca-stearate | 1.0 |
| Distearylthiodipropionate | 0.2 |
| 2,2,6,6-tetramethylpiperidine ester | 0.25 |
| Carbonate oligomer | 0.2 |

The above compound was milled and compression molded to give a sheet of 0.5mm in thickness. Using the sheet, resistance to light was measured in the weatherometer and measured heat stability in a Geer oven at 150° C.

The results are shown in Table-6.

Table - 6

| No. | Piperidine Compounds | Carbonate Oligomer Compounds | Resistance to Light hrs | Heat Stability hrs |
|---|---|---|---|---|
| Control | | | | |
| 4-1 | None | None | 350 | 152 |
| 4-2 | None | No.5 (Table-2) | 380 | 365 |
| 4-3 | No.6 (Table-1) | None | 660 | 280 |
| 4-4 | 2-(2'-hydroxy-5'-methylphenyl) benzotriazole | No.13 (Table-2) | 720 | 413 |
| Example | | | | |
| 4-1 | No.1 (Table-1) | No.15 (Table-2) | 910 | 588 |
| 4-2 | No.4 (Table-1) | No.20 (Table-2) | 1,070 | 604 |
| 4-3 | No.6 (Table-1) | No.5 (Table-2) | 980 | 627 |
| 4-4 | No.12 (Table-1) | No.2 (Table-2) | 1,120 | 562 |
| 4-5 | No.17 (Table-1) | No.13 (Table-2) | 1,050 | 614 |
| 4-6 | No.22 (Table-1) | No.23 (Table-2) | 1,100 | 620 |

The tests results in Table 6 demonstrate the great improvement in both resistance to light and heat stability obtained with the stabilizer composition of the invention. The contrast between Example 4-5 of the invention and Control 4-4 where a conventional 2-hydroxyarylbenzotriazole light stabilizer is used instead of a 2,2,6,6-tetramethylpiperidine ester is particularly noteworthy.

EXAMPLE 5

| ABS resin | 100 parts by weight |
|---|---|
| Zn-stearate | 0.5 |
| 2,2,6,6-tetramethylpiperidine ester | 0.60 |
| Carbonate oligomer | 0.25 |

The above compound was milled, and molded to obtain a sheet of 3mm in thickness. Using the sheet, retention of tensile strength before and after irradiation for 800 hrs. in the weatherometer was measured. Also, the color of the sheet after 10 minutes heating at 210° C. and 50kg/cm² was measured and rated on a color scale from which 10 means brown to 1 which means white.

The results are shown in Table-7. "Tension" in the table refers to tensile strength.

Table - 7

| No. | Piperidine Compounds | Carbonate Oligomer Compounds | Retention of Tension % | Color of Sheet |
|---|---|---|---|---|
| Control | | | | |
| 5-1 | None | None | 42 | 9 |
| 5-2 | None | No.16 (Table-2) | 44 | 5 |
| 5-3 | No.14 (Table-1) | None | 51 | 9 |
| Example | | | | |
| 5-1 | No.5 (Table-1) | No.9 (Table-2) | 76 | 3 |
| 5-2 | No.8 (Table-1) | No.18 (Table-2) | 75 | 3 |
| 5-3 | No.11 (Table-1) | No.16 (Table-2) | 84 | 2 |
| 5-4 | No.14 (Table-1) | No.12 (Table-2) | 79 | 3 |
| 5-5 | No.15 (Table-1) | No.22 (Table-2) | 82 | 2 |
| 5-6 | No.23 (Table-1) | No.10 (Table-2) | 80 | 3 |
| 5-7 | No.24 (Table-1) | No.4 (Table-2) | 82 | 2 |

The test results of Table 7 demonstrate the unexpected synergistic interaction of components of the stabilizer composition according to this invention. Either the 2,2,6,6-tetramethylpiperidine ester or the carbonate oligomer when used alone provides only a marginal improvement in retention of tensile strength, while the composition of the invention is far superior in retention of tensile strength and in preventing discoloration when heated at 210° C.

EXAMPLE 6

| Nylon 6 | 100 parts by weight |
|---|---|
| 2,2,6,6-tetramethylpiperidine ester | 0.25 |
| Carbonate oligomer | 0.1 |

The above compound was throughly milled, and molded at 250° C. to prepare a sheet of 0.5mm in thickness. Using the sheet, the color of sheet after 120 hrs. irradiation in the weatherometer was measured, as an indication of resistance to light. Also, heat stability was judged from the color of the sheet after 30 minutes heating at 225° C.

The results are shown in Table-8.

Table - 8

| No. | Piperidine Compounds | Carbonate Oligomer Compounds | Color of Sheet after Irradiation | Color of Sheet after Heating |
|---|---|---|---|---|
| Control | | | | |
| 6-1 | None | None | dark brown | dark brown |
| 6-2 | No.9 (Table-1) | None | yellow | brown |
| 6-3 | None | No.6 (Table-2) | brown | light yellow |
| Example | | | | |
| 6-1 | No.6 (Table-1) | No.20 (Table-2) | light yellow | light yellow |
| 6-2 | No.9 (Table-1) | No.17 (Table-2) | " | very pale |
| 6-3 | No.10 (Table-1) | No.4 (Table-2) | " | " |
| 6-4 | No.14 (Table-1) | No.6 (Table-2) | very pale | " |
| 6-5 | No.18 (Table-1) | No.11 (Table-2) | " | light yellow |
| 6-6 | No.23 (Table-1) | No.19 (Table-2) | light yellow | very pale |

EXAMPLE 7

| Polybutylene terephthalate | 100 parts by weight |
|---|---|
| Trisnonylphenylphosphite | 0.1 |
| 2,2,6,6-tetramethylpiperidine ester | 0.4 |
| Carbonate oligomer | 0.5 |

The above compound was processed by injection molding at 270° C. to prepare dumbell specimens. Using these specimens, retention of tensile strength after the 500 hours irradiation in the weatherometer was determined, as well as the retention of tensile strength after 240 hours heat aging at 150° C.

Results are shown in Table-9. "Tension" in the table headings refers to tensile strength.

Table - 9

| No. | Piperidine Compounds | Carbonate Oligomer Compounds | Tension Retention after Irradiation % | Heat Aging % |
|---|---|---|---|---|
| Control | | | | |
| 7-1 | None | None | 48 | 60 |
| 7-14 2 | No.24 (Table-1) | None | 71 | 64 |
| 7-14 3 | None | No.22 (Table-2) | 51 | 74 |
| 7-4 | No.11 (Table-1) | 4,4'-n-butylidene bis(3-methyl-6-t-butylphenol) | 73 | 70 |
| Example | | | | |
| 7-1 | No.7 (Table-1) | No.8 (Table-2) | 80 | 79 |
| 7-2 | No.9 (Table-1) | No.16 (Table-2) | 85 | 82 |
| 7-3 | No.11 (Table-1) | No.22 (Table-2) | 88 | 85 |
| 7-4 | No.15 (Table-1) | No.18 (Table-2) | 83 | 82 |
| 7-5 | No.17 (Table-1) | No.5 (Table-2) | 82 | 83 |
| 7-6 | No.24 (Table-1) | No.23 (Table-2) | 85 | 80 |

The results of the tests in Table 9 demonstrate the great advantage in retention of tensile strength of polybutylene terephthalate both after irradiation for 500 hours and after heat aging for 240 hours at 150° C.

EXAMPLE 8

| Polypropylene | 100 parts by weight |
|---|---|
| 2,2,6,6-tetramethylpiperidine ester | 0.3 |
| Carbonate oligomer | 0.2 |

The above compound was milled on a 2 roll mill and compression molded to prepare a sheet of 0.5mm in thickness. Using portions of the sheet, resistance to light was measured in the weatherometer, heat stability in the oven at 160° C. and resistance to staining due to $NO_x$ gas using a Dyeing Fastness Tester according to JIS (Japanese Industrial Standard) L 8055.

As an expression of resistance to gas staining, yellowness was measured by Hunter Color meter of the sheet exposed in $NO_x$ gas at room temperature for 72 hours. The results are shown in Table-10.

Table - 10

| No. | Piperidine Compounds | Carbonate Oligomer Compounds | Resistance to Light hrs | Heat Stability hrs | Resistance to Staining % |
|---|---|---|---|---|---|
| Control | | | | | |
| 8-1 | No.10 (Table-1) | 1,1,3-tris (2-methyl-4-hydroxy-5-t-butylphenyl) butane | 560 | 300 | 19 |
| 8-2 | No.23 (Table-1) | pentaerythritol tetrakis [β-(3,5-di-t-butyl-4-hydroxyphenyl)propionate] | 610 | 650 | 18 |
| 8-3 | 2-(2'-hydroxy-5-methylphenyl) benzotriazole | No.19 (Table-2) | 480 | 720 | 12 |
| Example | | | | | |
| 8-1 | No.4 (Table-1) | No.14 (Table-2) | 740 | 860 | 8 |
| 8-2 | No.10 (Table-1) | No.19 (Table-2) | 730 | 890 | 9 |
| 8-3 | No.11 (Table-1) | No.17 (Table-2) | 790 | 910 | 8 |
| 8-4 | No.14 (Table-1) | No.5 (Table-2) | 760 | 880 | 9 |
| 8-5 | No.17 (Table-1) | No.21 (Table-2) | 730 | 850 | 10 |
| 8-6 | No.20 (Table-1) | No.15 (Table-2) | 780 | 890 | 8 |
| 8-7 | No.23 (Table-1) | No.6 (Table-2) | 770 | 840 | 9 |

The results of the tests in Table 10 demonstrate the far superior ability of the polypropylene samples stabilized with a stabilizer composition of the invention to withstand the harmful effects of light exposure, of oven aging at 160° C., and of exposure to oxides of nitrogen.

We claim:

1. A stabilizer composition capable of enhancing the resistance to deterioration of a synthetic resin upon exposure to light of wave length shorter than 400 nanometers and to heat at 150° C., comprising (a) a carboxylic acid ester of an alcohol linked to the 4 position of a 2,2,6,6-tetramethylpiperidine compound having each 2,2,6,6-tetramethylpiperidine ring nitrogen atom substituted with a hydrogen atom or an oxygen radical, and (b) an oligomeric carbonate ester of a polyhydric phenol having 2 to 3 phenolic groups disposed on 1 to 3 benzenoid rings and an average molecular weight between 400 and 4000.

2. A stabilizer composition according to claim 1 in which the 2,2,6,6-tetramethylpiperidine ester (a) has from 1 to 4 carboxylic acid ester groups and from 15 to 75 carbon atoms in the molecule.

3. A stabilizer composition according to claim 1 in which the weight ratio of the 2,2,6,6-tetramethylpiperidine ester (a) to the carbonate ester (b) is between 10 to 1 and 1 to 5.

4. A stabilizer composition according to claim 1 in which the 2,2,6,6-tetramethylpiperidine ester (a) contains from 2 to 8 percent by weight piperidine nitrogen.

5. A stabilizer composition according to claim 1 in which the 2,2,6,6-tetramethylpiperidine ester (a) is an ester of 2,2,6,6-tetramethylpiperidine-4-ol.

6. A stabilizer composition according to claim 1 in which the 2,2,6,6-tetramethylpiperidine ester (a) is an ester of an oxygen heterocyclic alcohol linked to the 4 position of a 2,2,6,6-tetramethylpiperidine.

7. A stabilizer composition according to claim 1 in which the 2,2,6,6-tetramethylpiperidine ester (a) is an ester of an open chain carboxylic acid having two to four ester groups in the molecule.

8. A stabilizer composition according to claim 1 in which the 2,2,6,6-tetramethylpiperidine ester (a) is an ester of a carbocyclic acid having two to four ester groups in the molecule.

9. A stabilizer composition according to claim 1 in which the 2,2,6,6-tetramethylpiperidine ester (a) is an ester of a heterocyclic carboxylic acid having one to four ester groups in the molecule.

10. A stabilizer combination according to claim 7 in which the 2,2,6,6-tetramethylpiperidine ester (a) is N,N,N-tris(2,2,6,6-tetramethylpiperidine-4-yl) nitrilotriacetate.

11. A stabilizer composition according to claim 7 in which the 2,2,6,6-tetramethylpiperidine ester (a) is tris (2,2,6,6-tetramethylpiperidine-4,4(1',3'-dioxyisobutane-2-methyl)but-3-ene-1,2,3-tricarboxylate.

12. A stabilizer composition according to claim 7 in which the 2,2,6,6-tetramethylpiperidine ester (a) is tris(2,2,6,6-tetramethylpiperidine-4-yl)-2-acetoxy-1,2,3-propanetricarboxylate.

13. A stabilizer composition according to claim 1 in which the 2,2,6,6-tetramethylpiperidine ester (a) has the formula:

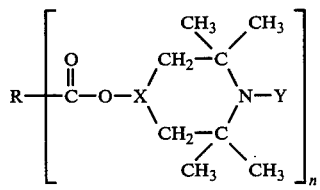

in which $n$ is a whole number from 1 to 4, Y is selected from the group consisting of hydrogen and oxyl radical, X is a three-valent linking member selected from the group consisting of —CH<,

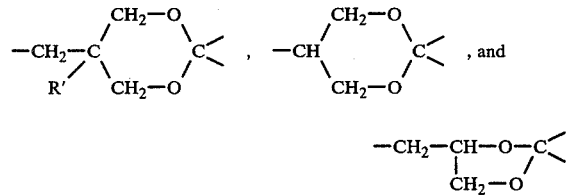

wherein R' is a lower alkyl group, and R is an organic group having a valence of $n$ that can be open chain, carbocyclic, and hetercyclic.

14. A stabilizer composition according to claim 13 in which Y is hydrogen.

15. A stabilizer composition according to claim 13 in which Y is oxyl radical and R' is ethyl.

16. A stabilizer composition according to claim 1 in which the carbonate ester is an ester of 2,5-di-t-butylhydroquinone.

17. A stabilizer composition in accordance with claim 1 in which the carbonate ester is an ester of an alkylidenebisphenol.

18. A stabilizer composition according to claim 1 in which the carbonate ester is an ester of bisphenol having two benzenoid rings linked through sulfur.

19. A stabilizer composition according to claim 1 in which the carbonate ester is an ester of a trisphenol.

20. A stabilizer composition according to claim 1 containing as an additional stabilizing ingredient at least one compound selected from the group consisting of thiodipropionate esters, 1,2-epoxides, organic phosphites, and metal salts of monocarboxylic acids having 6 to 24 carbon atoms.

21. A stabilizer composition according to claim 1 in which the carbonate ester has the formula:

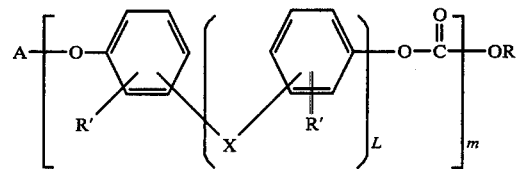

wherein independently at each occurrence, R' denotes a hydrogen atom, or an alkyl, cycloalkyl or arylalkyl radical, A is a hydrogen atom or

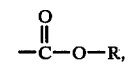

R is an alkyl, aryl, alkylaryl, arylalkyl, or cycloalkyl radical or

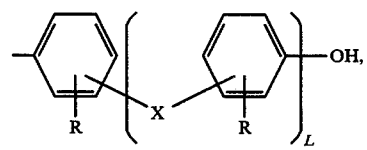

X is a single bond, —O—, —S—,

—CH$_2$SCH$_2$—, a divalent hydrocarbon radical or

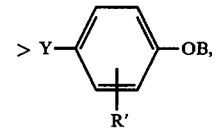

where Y is a trivalent hydrocarbon radical, B is selected from the group consisting of hydrogen and

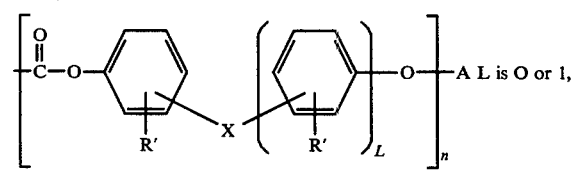

$m$ is 1 to about 20, and $n$ is 0.1 to about 20.

22. A stabilizer synthetic resin composition comprising a synthetic resin and a stabilizing amount of a stabilizer composition according to claim 1.

23. A resin composition according to claim 22 in which the quantity of stabilizer composition is from 0.02 to 10 percent by weight of the synthetic resin.

24. A resin composition according to claim 22 in which the resin is at least one polymer selected from the group consisting of olefin polymers, acrylic polymers, vinyl halide polymers, and polyamides.

* * * * *